United States Patent [19]

Jones et al.

[11] 4,031,935

[45] June 28, 1977

[54] CAPTIVE FASTENER ASSEMBLY

[75] Inventors: Lary D. Jones; Robert H. van Outer, both of Lexington, Ky.; Ernest S. Kettelson, Minooka, Ill.

[73] Assignee: Square D Company, Park Ridge, Ill.

[22] Filed: Apr. 21, 1976

[21] Appl. No.: 678,786

Related U.S. Application Data

[62] Division of Ser. No. 597,062, July 18, 1975, Pat. No. 3,986,544.

[52] U.S. Cl. .............................. 151/41.76; 151/69
[51] Int. Cl.² ...................... F16B 5/02; F16B 39/00
[58] Field of Search .......... 151/41.76, 41.7, 41.71, 151/69; 403/21, 22; 85/32 K; 52/758 F

[56] References Cited

UNITED STATES PATENTS

| | | | |
|---|---|---|---|
| 1,498,360 | 6/1924 | Douglas | 85/32 K |
| 2,140,628 | 12/1938 | Hoff | 151/41.76 X |
| 2,171,385 | 8/1939 | Zeidler | 85/32 K |
| 2,885,230 | 5/1959 | Terpin | 403/21 |
| 2,988,855 | 6/1961 | Asfour et al. | 151/69 X |
| 3,093,222 | 6/1963 | Christoffersen | 151/69 X |
| 3,490,509 | 1/1970 | Otteson et al. | 151/69 |
| 3,498,655 | 3/1970 | Arms et al. | 151/41.76 X |

FOREIGN PATENTS OR APPLICATIONS

| | | | |
|---|---|---|---|
| 1,027,931 | 4/1966 | United Kingdom | 151/69 |
| 870,921 | 6/1961 | United Kingdom | 151/41.76 |
| 1,270,248 | 4/1972 | United Kingdom | 151/41.76 |

*Primary Examiner*—Ramon S. Britts
*Attorney, Agent, or Firm*—Richard T. Guttman; Ernest S. Kettelson

[57] ABSTRACT

A captive fastener assembly, comprising a guide rail structure, a screw mounted thereon for linear movement relative to the guide rail structure but restrained from rotational movement, and a captive nut mounted in a cooperative bracket for rotational movement but restrained from linear movement relative to the bracket. The invention is particularly useful in fastening various work pieces together, such as an electric terminal box and a meter cabinet, the guide rail structure being mounted on one of the work pieces with the screw captively in place and the bracket secured to the other work piece with the nut captively mounted therein.

1 Claim, 18 Drawing Figures

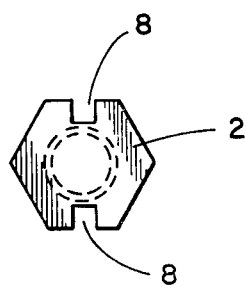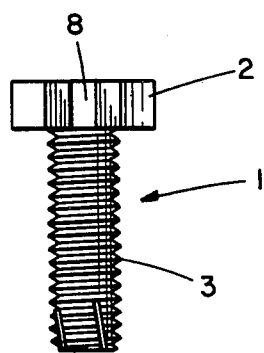
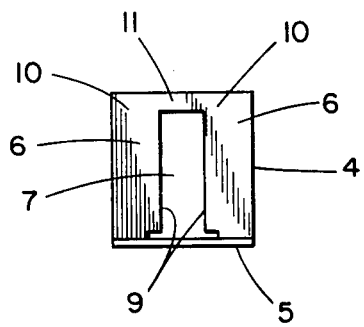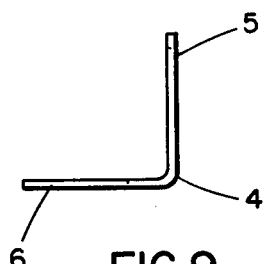
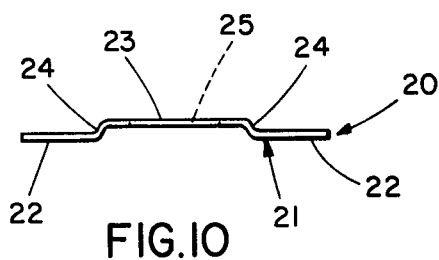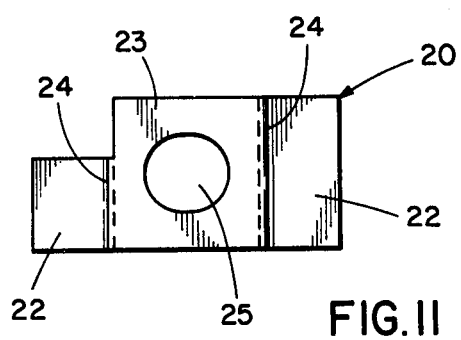
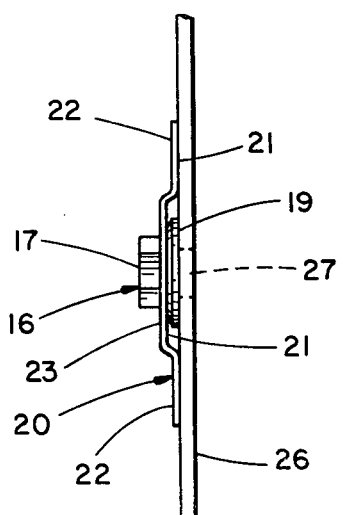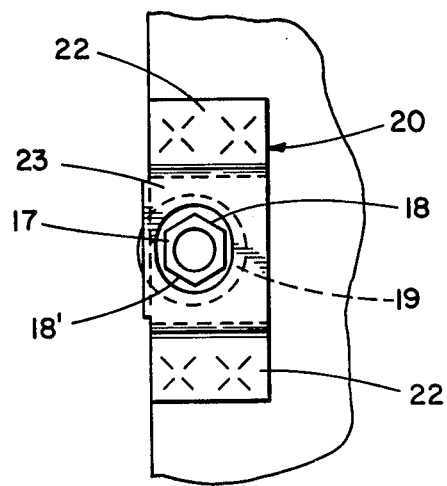

CAPTIVE FASTENER ASSEMBLY

BACKGROUND OF THE INVENTION

This is a Division of co-pending application Ser. No. 597,062, filed July 18, 1975, now U.S. Pat. No. 3,986,544.

This invention relates to the field of fastening devices of the two-part type, particularly those adapted for use in relatively inaccessible locations and which include means to captivate the inacessible member, for example a screw or nut, against rotation while the other member is rotated to tighten or remove.

More particularly, the invention relates to a captive fastening device for use with electrical units which must be fastened together, such as for example meter cabinets and bus bar terminal boxes. For outside use, such units must be fastened together securely enough to provide a rain tight seal. Accordingly, the fastening device must be reliable, capable of being tightened securely enough to make a water tight seal, and relatively small due to the minimal space available. The fastening devices should also be captively intalled, to guard against the possibility of dropping one or both pieces of a two-part fastener and losing it in the interior of the electrical cabinet or terminal box where it could be a dangerous hazard. Preferably, the fastening device should have both pieces of the two-part fastener captivated.

Existing fastening devices of this kind restrain one of the members by holding it captive in a structural unit, but the other member of the two-part fastener is left free. When assembling two units togethr in close quarters and relatively inaccessible locations, it becomes particularly difficult if the workman has to hold the loose member of the fastening device in one hand while trying to manipulate and position the work pieces or units to be fastened together with the other hand. In many cases, it is desirable and necessary to have both hands free to align the work pieces which are to be fastened together.

The invention described herein holds both members of the fastening device captive, and in place ready for fastening. One is captively mounted in such a way that it may move reciprocally in an axial direction but not rotationally relative to the assembly in which it is held, the other in such a way that it may move rotationally but not reciprocally with respect to the assembly in which it is held.

SUMMARY OF THE INVENTION

It is an object of the invention to provide a captive fastener assembly comprising a guide rail structure, a screw mounted thereon for linear movement relative thereto but restrained from rotational movement, and a captive nut mounted in a cooperative bracket for rotational movement but restrained from linear movement relative to the bracket, the captive nut being also held substantially in axial alignment with an opening through said bracket to receive the screw member therethrough.

It is an object of the invention to provide a captive fastener assembly in which both members of a two-piece fastening device are captively mounted.

It is an object of the invention to provide a captive fastener assembly in which both members of a two-piece fastening device are captively and permanently mounted on respective work pieces which are to be fastened together.

It is an object of the invention to provide a captive fastener assembly in which both members of a two-piece fastening device are captively and permanently mounted in a fastening assembly, with access means to at least one of the members for manipulation thereof to a fastening and an unfastening position.

BRIEF DESCRIPTION OF THE DRAWINGS

FIG. 6 is a plan view of a screw member of a captive fastner in accordance with this invention.

FIG. 7 is an elevation view of the screw member of FIG. 6.

FIG. 8 is a plan view of a screw captivating structure in accordance with this invention.

FIG. 9 is an elevation view of the structure of FIG. 8.

FIG. 10 is an elevation view of a nut captivating structure in accordance with this invention.

FIG. 11 is a plan view of the structure in FIG. 10.

FIG. 12 is an elevation view of a nut captivating structure secured to the wall of a first unit, showing a nut assembly operably retained therein.

FIG. 13 is a plan view of FIG. 12.

DESCRIPTION OF PREFERRED EMBODIMENT

Figure 1:
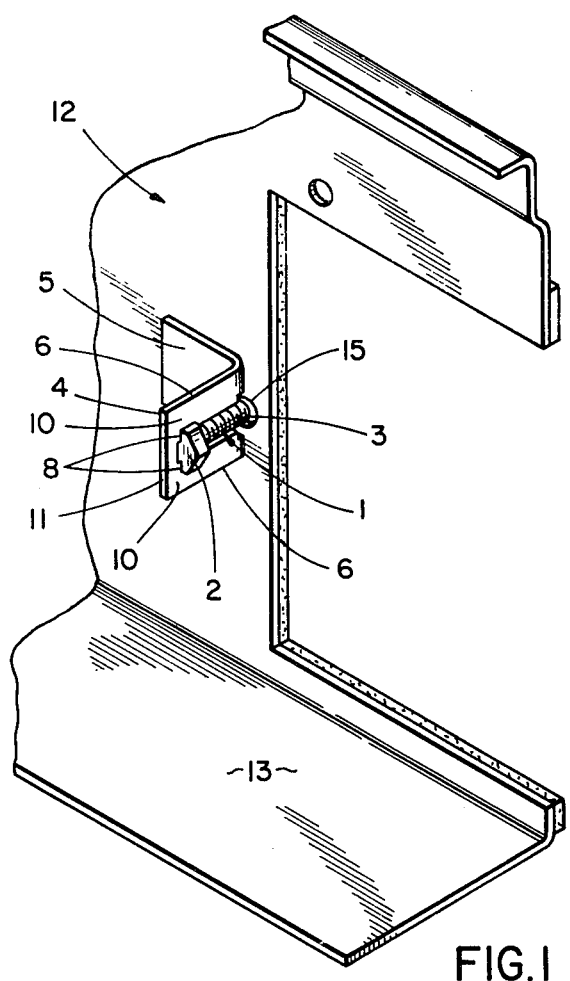
FIG. 1 is a perspective view of the screw member of a captive fastener assembly in accordance with this invention secured to the wall of a first unit.
Figure 2:
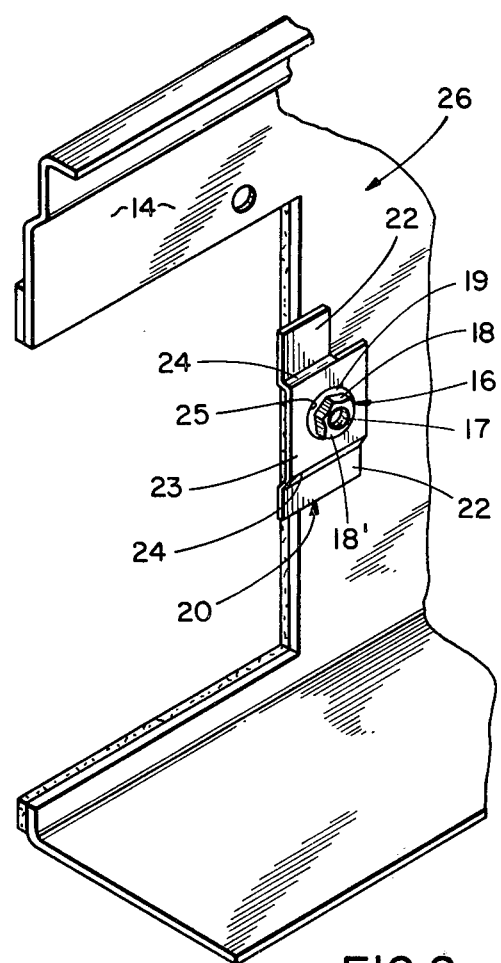
FIG. 2 is a perspective view of the nut member of a captive fastener assembly in accordance with this invention secured to the wall of a second unit to be fastened to the first unit of FIG. 1.
Figure 3:
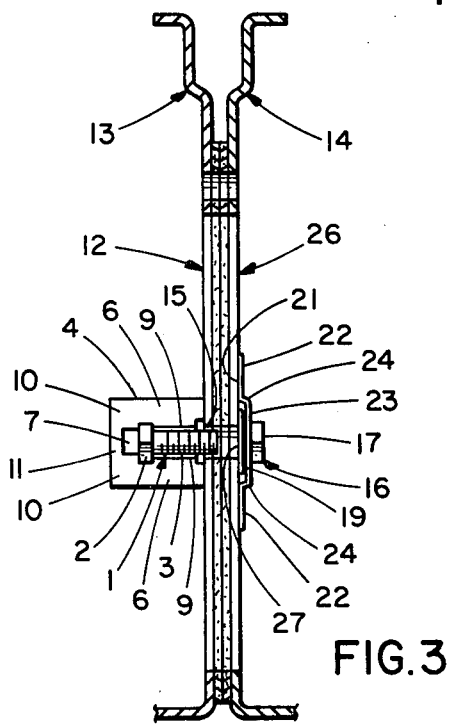
FIG. 3 an end elevation, partly in section of FIGS. 1 and 2.
Figure 4:
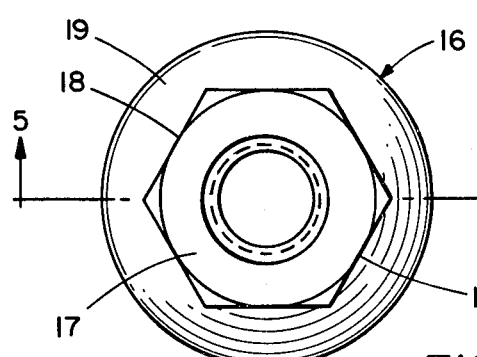
FIG. 4 is a plan view of a nut assembly of a captive fastener assembly in accordance with this invention.
Figure 5:
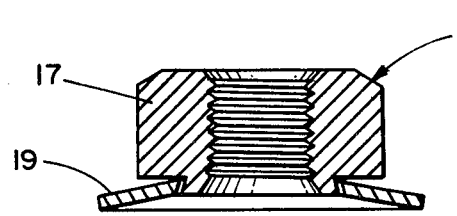
FIG. 5 is a section taken on line 5—5 of FIG. 4.
Figure 14:
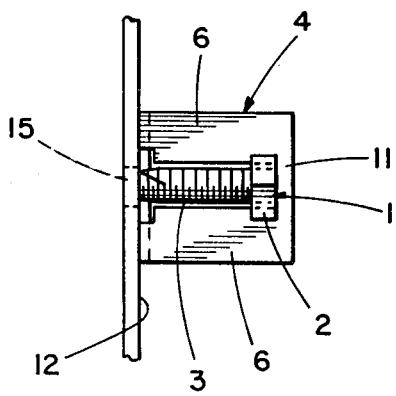
FIG. 14 is an elevation view of a screw captivating structure secured to the wall of a second unit to be fastened to the first unit shown in FIG. 12, showing a screw member operably retained therein.
Figure 15:
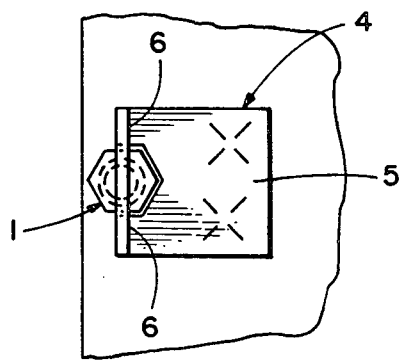
FIG. 15 is a plan view of FIG. 14.

The captive fastener assembly in accordance with this invention includes a screw member 1, having a head 2 and a threaded shank 3. The screw member 1 is mounted in a screw captivating structure 4, of generally L-shaped configuration in elevation, having an end wall 5 extending at a right angle from elongated guide rails 6. A passageway 7 extends between the parallel, spaced apart guide rails 6. Screw member 1 is positioned for sliding movement in passageway 7. The head 2 of screw member 1 has slots 8 formed therein opening to diametrically opposite sides and slidably receiving therein the respective inward facing edges 9 of said spaced apart guide rails 6.

The screw head 2 is thus held captively between the guide rails 6 for sliding engagement therewith between a fully fastened position and a fully unfastened position.

The elongated guide rails 6 preferably extend from said end wall 5 for a distance at least equal to the length of the screw member 1. The projected ends 10 of said guide rails 6 are integrally connected by an integrally formed cross-arm 11, which serves as an abutting stop to block further outward movement of screw head 2 when extended in the fully unfastened position.

The screw captivating structure 4 is secured to an appropriate selected wall portion 12 of a first work piece 13 which is to be fastened to a second work piece 14. A hole 15 extends through the wall portion 12, and screw captivating structure 4 is mounted in relation to hole 15 so that threaded shank 3 of screw member 1 between guide rails 6 is axially aligned with hole 15. The screw captivating structure 4 is secured to wall portion 12 by welding, for example, end wall 5 of structure 4 to wall portion 12.

The second member of the two piece captive fastener assembly in accordance with this invention is a nut assembly 16, having a threaded nut 17 with tool engaging means thereon such as opposed flat surfaces 18 and 18', and a washer 19 of larger circumference than that of the nut 17. The nut 17 is secured to the washer 19, in axial alignment therewith, by welding for example. The nut assembly 16 is mounted in a nut captivating structure 20 comprising a bracket having inward facing surface 21, flat mounting ears 22 at opposite ends, and a slightly raised intermediate portion 23 between said mounting ears. The inward facing surface of intermediate portion 23 is spaced apart outwardly from the inward facing surfaces of the flat mounting ears 22 at each end, a distance slightly greater than the thickness of washer 19. The length and width of intermediate portion 23 is sufficiently large in relation to the circumference of washer 19 to enable it to clear the spacing wall portions 24 which integrally join the intermediate portion 23 to the respective mounting ears 22. A hole 25 extends through intermediate portion 23, the hole being sufficiently large to receive nut 17 therethrough for rotation when the washer 19 of nut assembly 16 is positioned adjacent the inward facing surface of intermediate portion 23.

The nut captivating structure 20 is secured to an appropriate selected wall portion 26 of the second work piece 14. A hole 27 extends through the wall portion 26, and the nut captivating structure 20 is mounted in relation to hole 27 so the holes through nut 17 and washer 19 of nut assembly 16 may be axially aligned therewith. The nut captivating structure 20 is secured to wall portion 26 by welding, for example, the inward facing surfaces of mounting ears 22 to the wall portion 26. When so mounted, intermediate portion 23 is spaced from wall portion 26 a sufficient distance to enable washer 19 which is captivated therebetween to rotate freely, but reciprocal motion of said washer in an axial direction is substantially prevented.

The hole 25 through intermediate portion 23 is sufficiently larger than the periphery of nut 17 which projects therethrough, to permit some lateral movement of nut assembly 16 for purposes of centering the nut 17 for threaded engagement with the shank 3 of the screw member 1 when positioning the first and second work pieces for fastening together.

In a preferred embodiment, the screw member and nut assembly are permanently captivated in their respective captivating structures which are likewise permanently secured to respective wall portions of first and second work pieces at locations thereon for fastening the work pieces together. By being permanently captivated in accordance with this invention, the screw member and nut assembly will not bcome dislodged during shipment and handling.

Figure 16:
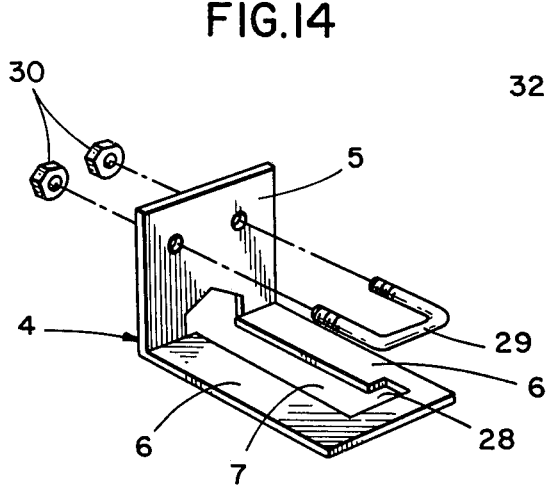
FIG. 16 is a perspective view of a modified screw captivating structure in accordance with this invention.
Figure 17:
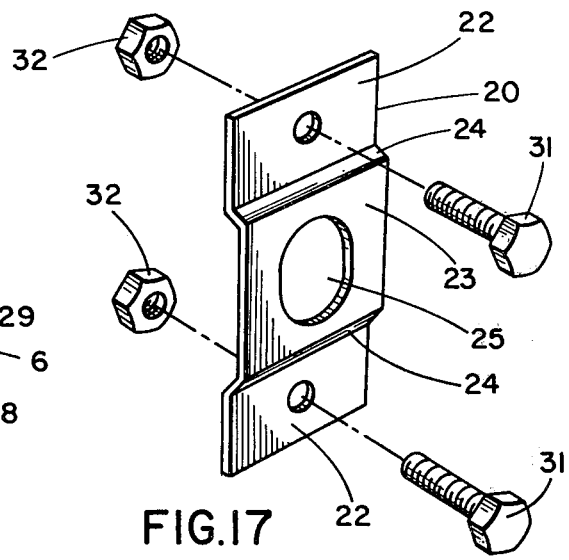
FIG. 17 is a perspective view of a modified nut captivating structure in accordance with this invention.
Figure 18:
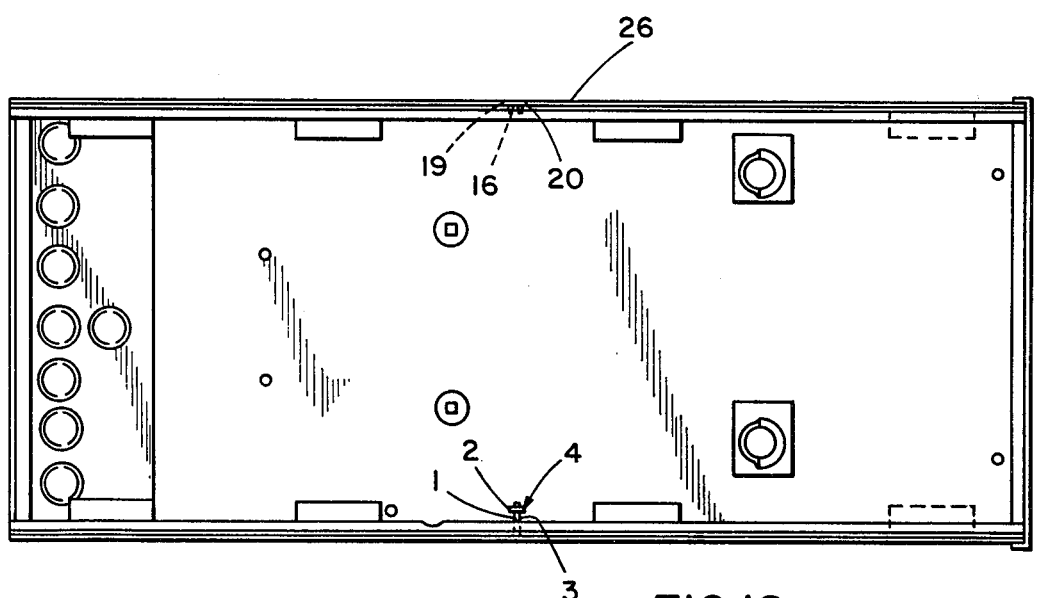
FIG. 18 is a plan view of an enclosure for electrical devices showing a screw captivating structure and screw member secured to a first wall and a nut captivating structure and nut assembly secured to the opposite second wall, such enclosure being fastenable first wall-to-second wall with a like enclosure to assemble an electrical installation comprising a plurality of ganged enclosures.

A modified form of the invention is illustrated in FIG. 16. One of the guide rails designated 6' includes a notch 28 of configuration and dimension corresponding to that of the peripheral edge of screw head 2, to enable such edge to pass through said notch when screw member 1 is moved outwardly to the fully unfastened position. Such modification enables the screw member 1 to be removed from the screw captivating structure and reinserted therein. In the event the threads become stripped on screw member 1, or it becomes otherwise damaged, such screw member may be removed and a new one mounted in place.

The respective screw captivating structure 4 and nut captivating structure 20 may also be removably secured to respective wall portions of first and second work pieces, rather than permanently secured by welding. Removable securing means may include U-bolt 29 and nuts 30 to secure end wall 5 of the screw captivating structure 4 to a first work piece. Bolts 31 and nuts 32 may be used to secure mounting ears 22 of the nut captivating structure to a second work piece.

We claim:

1. A captive fastener assembly comprising a two-piece fastening device, including first and second fastening members, said first and second fastening members being engageable for fastening and separable for unfastening, first and second captivating means, wherein said first fastening member includes a threaded shank extending from a first end and a radially enlarged head formed at the opposite second end, said radially enlarged head includes a pair of radially extending slots opening to diametrically opposite sides of the periphery of said head, said first captivating means includes a pair of spaced apart parallel guide rails defining a passageway therebetween, the respective inner edges of said guide rails facing said passageway being slidably received in respective ones of said pair of slots in said head of said first fastening member, said threaded shank being positioned in said passageway when said guide rails are slidably received in said slots, said threaded shank being then held substantially parallel to said guide rails for reciprocating movement between an fastening and an unfastening position, said second fastening means includes an internally threaded nut, a washer axially aligned with said nut and secured to one side thereof, said threaded shank of said first fastening member being threadably engageable with said internally threaded nut, said second captivating means includes a bracket member having an inner surface to face a work piece when secured thereto, a pair of substantially flat mounting ears projecting laterally from each opposite end of said bracket, an intermediate portion of said bracket spaced outwardly from the plane of the inner surface of said laterally projecting mounting ears, the inner surface of said intermediate portion being spaced from the inner surfaces of said laterally projecting mounting ears a distance slightly greater than the thickness of said washer to permit rotation thereof while restraining substantial reciprocal movement of said washer in an axial direction relative to said bracket when secured to said work piece, an opening through said intermediate portion of said bracket member to receive said nut therethrough when said washer is positioned adjacent said inner surface of said laterally projecting mounting ears, said nut being sufficiently elongated to project outwardly of said bracket member for engagement by external means to rotate said nut, including a first and second work piece to be fastened together, said first captivating means is secured to said first work piece with said first fastening member operably mounted therein, said second captivating means is secured to said second work piece with said second fastening member operably mounted therein, said captivating means being secured to said respective work pieces at locations whereby said first and second fastening members are aligned for fastening engagement when said work pieces are in position for fastening, opening means through said first and second work pieces to permit communication between said first and second fastening members when aligned for fastening engagement, wherein said pair of guide rails of said first captivating means are at least as long as said first fastening member including the combined length of said threaded shank and said head, and fastener dismounting means to enable removal of said first fastening member from said first captivating means and re-installation of said member in said first captivating means, including an integrally formed cross-arm member extending across said passageway and between said pair of guide rails at the end thereof remote from the portion securable to said work piece, said fastener dismounting means comprising a recess in one of said guide rails opening to said passageway adjacent said cross-arm member, the configuration and dimension of said recess conforming to the cross-sectional configuration and dimension of the head of said first fastening member to enable the portion of said head adjacent said recess to rotatably pass through said recess for removal of said member from said captivating means and re-installation therein.

* * * * *